(12) United States Patent
Van Tran

(10) Patent No.: US 6,301,054 B1
(45) Date of Patent: Oct. 9, 2001

(54) OPTICAL ELEMENT FOR MULTIPLE BEAM SEPARATION CONTROL

(75) Inventor: Chuong Van Tran, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/428,390

(22) Filed: Oct. 28, 1999

(51) Int. Cl.[7] .............................. G02B 27/12; B41J 15/14
(52) U.S. Cl. .............................................. 359/639; 347/241
(58) Field of Search ..................................... 359/618, 619, 359/625, 628, 639, 640, 837; 347/225, 233, 239, 241, 243

(56) References Cited

U.S. PATENT DOCUMENTS

| | | | |
|---|---|---|---|
| 5,025,438 | * 6/1991 | Emoto | 369/112 |
| 5,155,628 | * 10/1992 | Dosmann | 359/640 |
| 5,566,024 | 10/1996 | Rauch | 359/571 |
| 6,037,965 | * 3/2000 | Gross et al. | 347/241 |

* cited by examiner

*Primary Examiner*—Georgia Epps
*Assistant Examiner*—David N. Spector
(74) *Attorney, Agent, or Firm*—William Propp

(57) ABSTRACT

A refractive optical element provides beam separation control for two or four light beams by refracting each beam from an incident surface through the optical element to be refracted from a parallel exit surface out of the optical element. The beams have closer beam to beam spacing after the refraction from the optical element than before. The incident and exit surfaces are angled relative to and symmetric around an optical axis.

2 Claims, 2 Drawing Sheets

OPTICAL ELEMENT FOR MULTIPLE BEAM SEPARATION CONTROL

BACKGROUND OF THE INVENTION

The present invention relates to multiple beam separation control and, more particularly, to a refractive optical element, which controls separation of two closely spaced laser beams.

High speed or color printing requires a multiple beam light source. One possible multiple beam light source is a laser diode array which is currently expensive and difficult to fabricate. Another approach to providing a multiple beam light source is to integrate individual laser diodes to form the multiple light beam source.

The major problem with integrating individual laser diodes into a multiple beam light source is the large spacing between the individual laser diodes. The spacing or pitch between two adjacent individual laser diodes can be 100 microns or larger while the required spacing of the two adjacent light beams for printing uses is 25 microns or less, a difference of a factor of four or greater.

Beam separation control uses optical elements to contract the pitch or spacing between light beams.

Current technology can use single crystals, particularly calcite crystals, as beam separation control. However, these crystals cannot be artificially grown, which limits their availability and ability to be mass reproduced. The crystals require extensive fabrication and precision assembly.

Alternate methods of glass plates and miniature prisms are expensive and difficult to manufacture. Mechanical adjustment is required to set the center to center spacing of the adjacent beams.

Beam combiners, as their name indicates, are optical elements that combine two or more light beams into a single overlapping composite beam. Beam combiners can be refractive optical elements such as prisms, diffractive optical elements such as diffraction gratings and reflective optical elements such as dichroic or partially silvered mirrors. Beam combiners are distinctly different optical elements from beam separation control.

Beam splitter prisms can be used for beam separation control but this approach reduces the intensity of the output beam by half due to light loss caused by splitting the beam.

One possible beam separation control device is found in U.S. Pat. No. 5,566,024, commonly assigned as the present application and herein incorporated by reference. Two sets of two single blazed binary diffractive optical elements form a beam separation control apparatus for contracting two wider spaced parallel beams into two closely spaced parallel beams.

It is an object of the present invention to provide beam separation control by a single refractive optical element.

SUMMARY OF THE INVENTION

According to the present invention, a refractive optical element provides beam separation control for two or four light beams by refracting each beam from an incident surface through the optical element to be refracted from a parallel exit surface out of the optical element. The beams have closer beam to beam spacing after the refraction from the optical element than before. The incident and exit surfaces are angled relative to and symmetric around an optical axis.

Other objects and attainments together with a fuller understanding of the invention will become apparent and appreciated by referring to the following description and claims taken in conjunction with the accompanying drawings.

DESCRIPTION OF THE INVENTION

Figure 1:
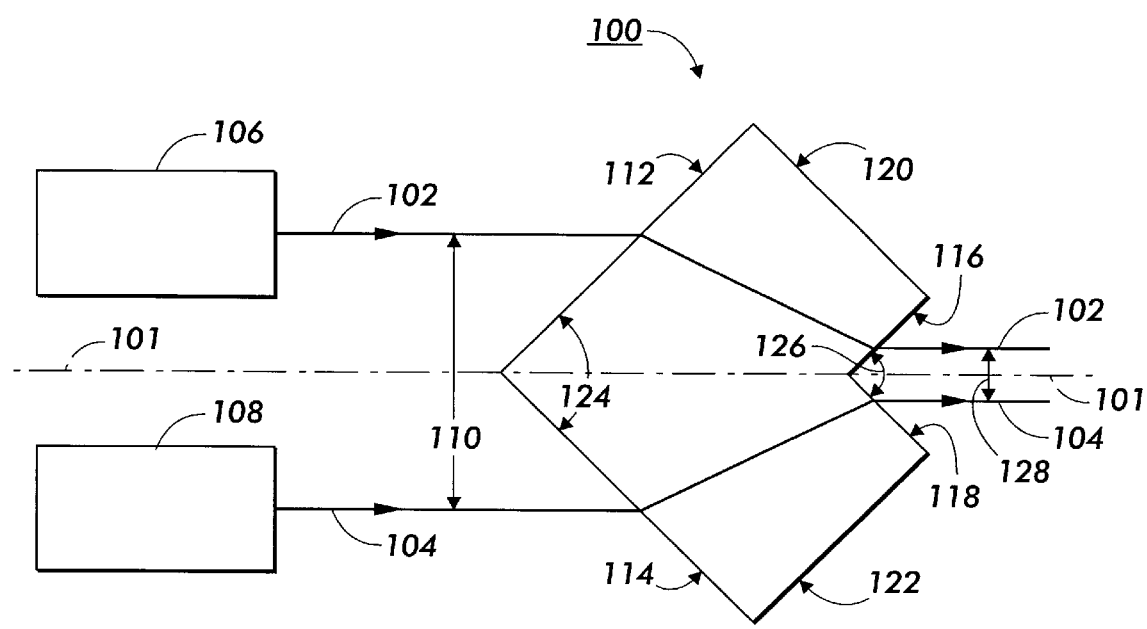
FIG. 1 is a schematic view of a first embodiment of the single refractive optical element for beam separation control of two laser beams of the present invention.

Referring now to FIG. 1, the single refractive optical element 100 of the present invention provides beam separation control for the dual light beams 102 and 104 emitted by the two individual laser diodes 106 and 108. The two light beams 102 and 104 are symmetric around the optical axis 101 and equally spaced from the optical axis 101 in the direction of light propagation. The single refractive optical element 100 is symmetric around the optical axis 101 in the direction of light propagation.

The first laser diode 106 emits the first light beam 102. The first light beam 102 is diverging and of a single wavelength. The second laser diode 108 emits the second light beam 104. The second light beam 104 is diverging and has the same single wavelength as the first light beam 102.

The two individual laser diodes 106 and 108 are not part of an array but can share a common assembly.

The dual light beams 102 and 104 are parallel to each other and separated by a first beam to beam spacing distance 110 of 100 microns. Typically, beam to beam spacing distances are measure from the center of the first beam to the center of the second beam.

The optical element 100 is a single solid element formed of a material that transmits light of the wavelength of light beams 102 and 104 and has a uniform index of refraction throughout the material. Examples would include plastics and BK7 glass, as are known in the art.

The optical element 100 has six flat facet surfaces and has a diamond pattern with a right triangle concave insert on the back corner.

The optical element has a first incident surface 112 adjacent to a second incident surface 114. The optical element has a first exit surface 116 adjacent to a second exit surface 118. The optical element has a fifth surface 120, which is adjacent to the first incident surface 112 and the first exit surface 116. The optical element has a sixth surface 122, which is adjacent to the second incident surface 114 and the second exit surface 118.

The first incident surface 112 is at a specified angle 124 with the second incident surface 114 and symmetric around the optical axis 101. The first exit surface 116 is at the same specified angle 126 with the second exit surface 118 and symmetric around the optical axis 101. The first incident surface 112 is parallel to the first exit surface 116. The second incident surface 114 is parallel to the second exit surface 116.

In this illustrative example, the angles 124 and 126 are right angles, as are all the other angles between the surfaces. The surfaces are angled relative to the optical axis. For the purposes of this invention, these angles 124 and 126 need not be right angles. The key features of this invention are the first incident surface and the first exit surface being parallel, the second incident surface and the second exit surface being parallel, the first and second incident surfaces being symmetrical around and angled relative to the optical axis and the first and second exit surfaces being symmetrical around and angled relative to the optical axis.

The first light beam 102 will be incident upon the first incident surface 112. The light beam 102 will be refracted by the surface 112 and transmitted through the optical element 100 to the first exit surface 116. The first light beam 102 will be refracted by the first exit surface 116 to emerge out of the optical element 100.

Since the first incident surface 112 is parallel to the first exit surface 116, the first light beam 102 exiting the optical element 100 will be parallel and collinear but positionally displaced to the first light beam 102 entering the optical element. Positionally displacement is measured in the beam to beam spacing relative to the optical axis.

The second light beam 104 will be incident upon the second incident surface 114. The light beam 104 will be refracted by the surface 114 and transmitted through the optical element 100 to the second exit surface 118. The second light beam 104 will be refracted by the second exit surface 118 to emerge out of the optical element 100.

Since the second incident surface 114 is parallel to the second exit surface 118, the second light beam 104 exiting the optical element 100 will be parallel and collinear but positionally displaced to the second light beam 104 entering the optical element.

The first light beam 102 and the second light beam 104 will be refracted from the optical element 100 parallel to each other and separated by a second beam to beam spacing distance 128 of 25 microns.

The second spacing distance 128 of 25 microns after the beams 102 and 104 have been through the optical element 100 is smaller than the first spacing distance 110 of 100 microns before the beams 102 and 104 have been through the optical element 100. While retaining the parallelism of the two beams, the optical element has provided beam separation control by spacing the two beams closer together.

The distance of displacement of the beam through the optical element will equal the thickness of the optical element times the sine of the angle of incidence of the beam to the incident surface times a first fraction with a numerator of 1 minus the cosine of the angle of incidence and a denominator of the square root of a second fraction with a numerator of the index of refraction of the material of the optical element and a denominator of the index of refraction of atmosphere, that second fraction minus the sine squared of the angle of incidence.

The optical element 100 of FIG. 1 has six flat facet surfaces and has a diamond pattern with a right triangle concave insert on the back corner. The optical element could alternately have a flat front surface between the first and second incident surfaces or a flat back surface between the first and second exit surfaces. The first and second exit surfaces could be the same length as the first and second incident surfaces providing a chevron shape to the optical element. The only requirement for the shape of the optical element is the first incident surface and the first exit surface being parallel, the second incident surface and the second exit surface being parallel, the first and second incident surfaces being symmetrical around and angled relative to the optical axis and the first and second exit surfaces being symmetrical around and angled relative to the optical axis.

Figure 2:
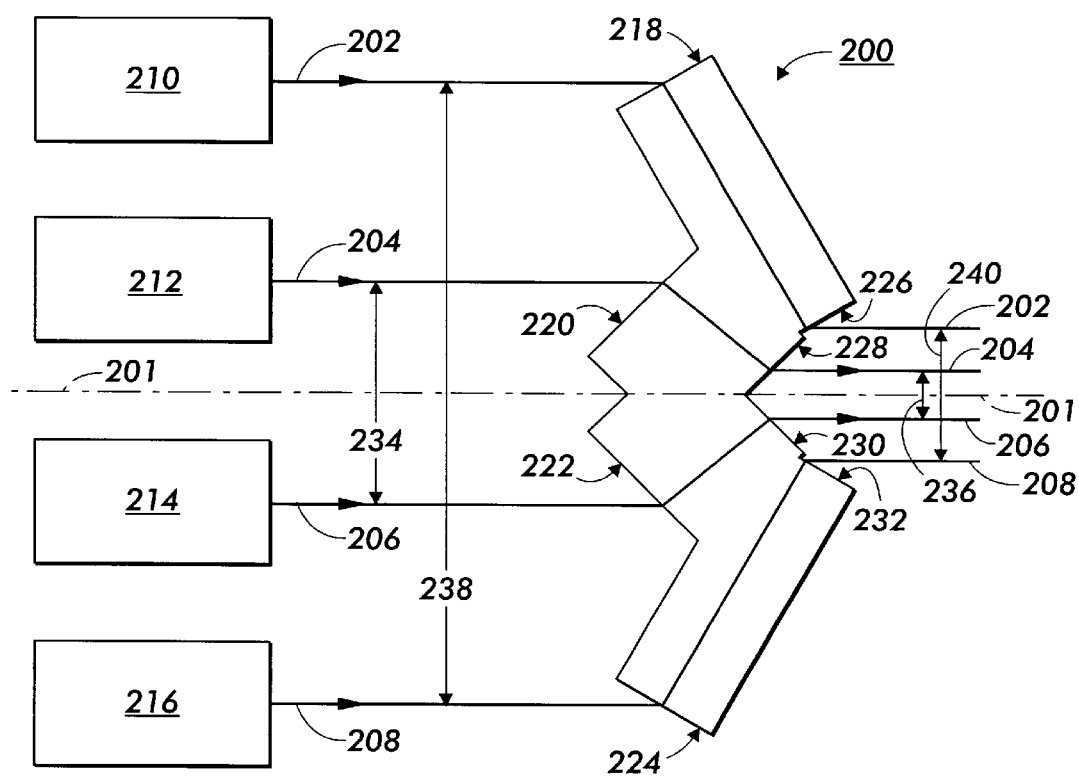
FIG. 2 is a schematic view of the single refractive optical element for beam separation control of four laser beams of the present invention.

Reference is now made to FIG. 2 where the single refractive optical element 200 of the present invention provides beam separation control for the four light beams 202, 204, 206 and 208 emitted by the four individual laser diodes 210, 212, 214, and 216.

The second and third light beams 204 and 206 are symmetric around the optical axis 201 and equally spaced from the optical axis 201 in the direction of light propagation. The first and fourth light beams 202 and 208 are symmetric around the optical axis 201 and equally spaced from the optical axis 201 in the direction of light propagation. The single refractive optical element 200 is symmetric around the optical axis 201 in the direction of light propagation.

The first laser diode 210 emits the first light beam 202. The second laser diode 212 emits the second light beam 204. The third laser diode 214 emits the third light beam 206. The fourth laser diode 216 emits the fourth light beam 208. All four light beams 202, 204, 206 and 208 are diverging and have the same single wavelength.

The four individual laser diodes 210, 212, 214, and 216 are not part of an array but can share a common assembly.

The second and third incident surfaces 220 and 222 are at a first specified angle with each other and symmetric around the optical axis 201 and equally spaced from the optical axis 201 in the direction of light propagation. The first and fourth incident surfaces 218 and 224 are at a second specified angle from each other and symmetric around the optical axis 201 and equally spaced from the optical axis 201 in the direction of light propagation.

The second and third exit surfaces 228 and 230 are at the first specified angle with each other and symmetric around the optical axis 201 and equally spaced from the optical axis 201 in the direction of light propagation. The first and fourth exit surfaces 226 and 232 are at the second specified angle from each other and symmetric around the optical axis 201 and equally spaced from the optical axis 201 in the direction of light propagation.

The first incident surface 218 is parallel to the first exit surface 226. The second incident surface 220 is parallel to the second exit surface 228.

The third incident surface 222 is parallel to the third exit surface 230. The fourth incident surface 224 is parallel to the fourth exit surface 232.

The first light beam 202 will be incident upon the first incident surface 218. The light beam 202 will be refracted by the surface 218 and transmitted through the optical element 200 to the first exit surface 226. The first light beam 202 will be refracted by the first exit surface 226 to emerge out of the optical element 200.

Since the first incident surface 218 is parallel to the first exit surface 226, the first light beam 202 exiting the optical element 200 will be parallel and collinear but positionally displaced to the first light beam 202 entering the optical element.

The second light beam 204 will be incident upon the second incident surface 220. The light beam 204 will be refracted by the surface 220 and transmitted through the optical element 200 to the second exit surface 228. The second light beam 204 will be refracted by the second exit surface 228 to emerge out of the optical element 200.

Since the second incident surface 220 is parallel to the second exit surface 228, the second light beam 204 exiting the optical element 200 will be parallel and collinear but positionally displaced to the second light beam 204 entering the optical element.

The third light beam 206 will be incident upon the third incident surface 222. The light beam 206 will be refracted by the surface 222 and transmitted through the optical element 200 to the third exit surface 230. The third light beam 206 will be refracted by the third exit surface 230 to emerge out of the optical element 200.

Since the third incident surface 222 is parallel to the third exit surface 230, the third light beam 206 exiting the optical element 200 will be parallel and collinear but positionally displaced to the third light beam 206 entering the optical element.

The fourth light beam 208 will be incident upon the fourth incident surface 224. The light beam 208 will be refracted by the surface 224 and transmitted through the optical element 200 to the fourth exit surface 232. The fourth light beam 208 will be refracted by the fourth exit surface 232 to emerge out of the optical element 200.

Since the fourth incident surface 224 is parallel to the fourth exit surface 232, the fourth light beam 208 exiting the optical element 200 will be parallel and collinear but positionally displaced to the fourth light beam 208 entering the optical element.

The second and third light beams 204 and 206 are separated by a first beam to beam spacing distance 234 before the optical element 200. The second and third light beams 204 and 206 will be refracted from the optical element 200 parallel to each other and separated by a second beam to beam spacing distance 236. The second spacing distance 236 is smaller than the first spacing distance 234. While retaining the parallelism of the two beams, the optical element has provided beam separation control by spacing the two beams closer together.

The first and fourth light beams 202 and 208 are separated by a third beam to beam spacing distance 238 before the optical element 200. The first and fourth light beams 202 and 208 will be refracted from the optical element 200 parallel to each other and separated by a fourth beam to beam spacing distance 240. The fourth spacing distance 240 is smaller than the third spacing distance 238. While retaining the parallelism of the two beams, the optical element has provided beam separation control by spacing the two beams closer together.

The optical element 200 can provide beam separation control for less than four beams with two or three beams being incident on adjacent incident surfaces.

Each beam can be individually modulated with either optical element 100 or 200.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam separation control apparatus for varying the separation distance between four light beams along an optical axis comprising:
    a first laser source for emitting a first light beam parallel to an optical axis,
    a second laser source for emitting a second light beam parallel to said optical axis,
    a third laser source for emitting a third light beam parallel to an optical axis, said second light beam and said third light beam being separated by a first spacing,
    a fourth laser source for emitting a fourth light beam parallel to said optical axis, said first light beam and said fourth light beam being separated by a second spacing, and
    an optical element having:
        a first incident surface for refracting said first light beam to a first exit surface which refracts said first light beam from said optical element, said first incident surface being parallel to said first exit surface, said first incident surface and said first exit surface being at a first angle to said optical axis,
        a second incident surface for refracting said second light beam to a second exit surface which refracts said second light beam from said optical element, said second incident surface being parallel to said second exit surface, said second incident surface and said second exit surface being at a second angle to said optical axis,
        a third incident surface for refracting said third light beam to a third exit surface which refracts said third light beam from said optical element, said third incident surface being parallel to said third exit surface, said third incident surface and third exit surface being at said second angle to said optical axis, whereby said second light beam and said third light beam being separated by a third spacing after refraction from said optical element, said third spacing being a lesser distance than said first spacing, and
        a fourth incident surface for refracting said fourth light beam to a fourth exit surface which refracts said fourth light beam from said optical element, said fourth incident surface being parallel to said fourth exit surface, said fourth incident surface and fourth exit surface being at said first angle to said optical axis, whereby said first light beam and said fourth light beam being separated by a fourth spacing after refraction from said optical element, said fourth spacing being a lesser distance than said second spacing.

2. A beam separation control apparatus for varying the separation distance between multiple light beams along an optical axis comprising:
    three or more laser sources, each source for emitting a light beam parallel to an optical axis, and
    an optical element having:
        an incident surface and an exit surface for each light beam, each light beam being refracted by said incident surface to said corresponding exit surface which refracts the light beam from said optical element, each corresponding incident surface and exit surface for each light beam being parallel to each other, each corresponding incident surface and exit surface for each light beam being at an angle to said optical axis, whereby the spacing between said light beams is a lesser distance after refraction from said optical element than the spacing between said light beams before refraction by said optical element.

* * * * *